March 2, 1926.
M. GUITIAN
PLATE LIFTER
Filed Nov. 25, 1925
1,575,576
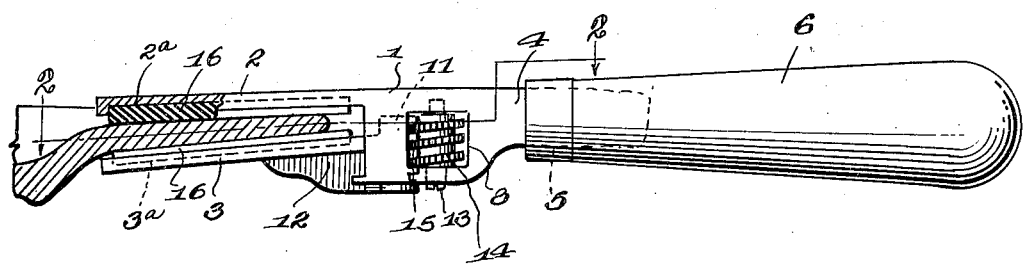
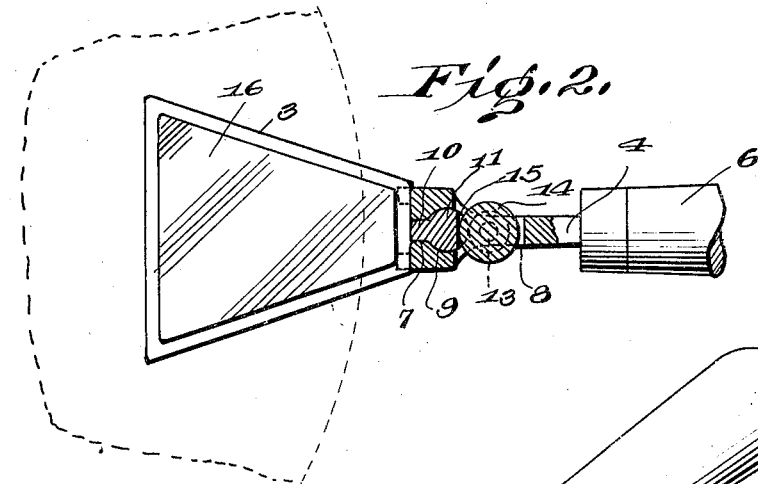
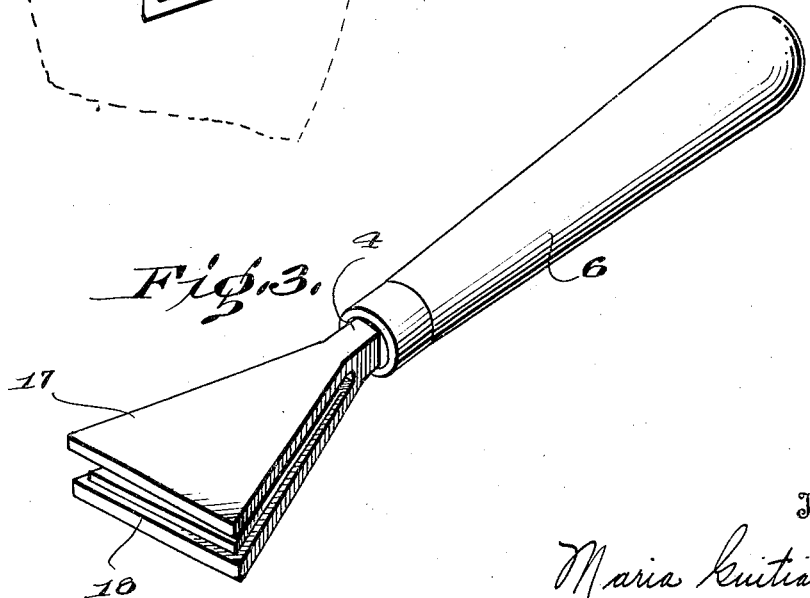
Inventor
Maria Guitian
By B. Singer
Attorney Patented Mar. 2, 1926.

1,575,576

UNITED STATES PATENT OFFICE.

MARIA GUITIAN, OF HABANA, CUBA.

PLATE LIFTER.

Application filed November 25, 1925. Serial No. 71,394.

*To all whom it may concern:*

Be it known that I, MARIA GUITIAN, a subject of the King of Spain, residing at Habana, in the Province of Habana, Cuba, have invented new and useful Improvements in Plate Lifters, of which the following is a specification.

This invention is an improved device for use in handling hot plates, platters and the like, the object of the invention being to provide an improved utensil of this character which is simple in construction and which is efficient in operation.

With the above and other objects in view, the invention consists in the construction, combination and arrangement of devices hereinafter described and claimed.

In the accompanying drawings—

Figure 1 is an elevation of a plate lifter constructed and arranged in accordance with my invention.

Figure 2 is a horizontal sectional view of the same on the plane indicated by the line 2—2 of Figure 1.

Figure 3 is a perspective view of a modified form of the plate lifter.

Referring especially to the form of the invention shown in Figures 1 and 2, the plate lifter comprises a head 1 which is provided with a pair of jaws 2, 3 and with a shank 4, which shank is secured in a socket 5 of a suitable handle 6 which may be of any suitable length. The jaw 2 is fixed to the head and the jaw 3 is movable toward and from the jaw 2 in order to grip plates, platters or the like of various thicknesses between said jaws. The head 1 has a slot 7 and also has an opening 8 with which said slot communicates. That portion of the slot 7 which is next the opening 8 has a substantially cylindrical enlargement 9. The jaw 3 has a neck 10 which extends through the slot 7 and is movable therein, the rear portion of said neck being substantially cylindrical in form as at 11 and fitting in the correspondingly shaped portion 9 of the slot 7. On its under side the jaw 3 has an integral plug 12, the rear portion of which is coincident with the neck 10.

Mounted for rotation in the slot 8, and on a screw stem 13 which forms its axis is a worm 14, the diameter of which somewhat exceeds the thickness of that portion of the shank 4 which joins the jaw 2 so that said worm at its opposite sides projects somewhat beyond opposite sides of the head and hence may be readily gripped by the thumb and forefinger to enable said worm to be turned. Said worm is preferably milled and engages teeth 15 with which the cylindrical portion 11 of the neck 10 is provided and hence by turning the worm the jaw 3 may be caused to move toward or from the jaw 2 as may be required to enable the tool to be used on a plate, platter or other like object of any thickness.

Each jaw is in form substantially an equilateral triangle, widening toward its outer end as shown. The opposing faces of the jaws are provided respectively with recesses 2ª, 3ª in which are fitted pads 16 to frictionally grip the article to be lifted or handled, the said pads being made of rubber, leather, felt, or any other suitable material.

The jaws are made of spring metal such as brass or steel so that they are capable of limited spring action toward and from each other and the jaws are also arranged at a slight angle with respect to each other so that the space between the jaws narrows toward the inner ends of the jaws as shown. This greatly facilitates the application of the tool to the edge of a plate, platter or the like.

In the form of the invention shown in Figure 3 the jaws 17 are both fixed to the head 18.

While I have herein shown and described two forms of my improved plate lifter, I would have it understood that changes may be made in the form, proportions and construction of the several parts without departing from the spirit of my invention and within the scope of the appended claims.

Having thus described my invention, I claim:

1. A plate lifter comprising a head arranged for the attachment of a handle thereto and a pair of spring jaws projecting from said head and each substantially an equilateral triangle in form, said jaws being arranged in spaced relation and at a slight angle to each other so that the space between said jaws contracts toward the inner ends of the jaws, said jaws having recesses in their opposing sides and pads in said recesses.

2. A plate lifter comprising a head arranged for the attachment of a handle thereto and a pair of spring jaws projecting from said head and each substantially an equilateral triangle in form, said jaws being arranged in spaced relation and at a slight angle to each other so that the space between said jaws contracts toward the inner ends of the jaws, one of said jaws being arranged for movement toward and from the other, and means to move said movable jaw, said means comprising a manually operable worm mounted for rotation in said head and said movable jaw having a neck movable in a slot in said head and provided with teeth which are engaged by said worm.

In witness whereof I affix my signature.

MARIA GUITIAN.